United States Patent
Takayama et al.

(10) Patent No.: US 12,044,633 B2
(45) Date of Patent: Jul. 23, 2024

(54) INSPECTION SYSTEM

(71) Applicant: THE NIPPON SIGNAL CO., LTD., Tokyo (JP)

(72) Inventors: Kazuaki Takayama, Kuki (JP); Masaki Takahashi, Kuki (JP); Takeshi Kitajima, Kuki (JP); Eishi Kawasaki, Kuki (JP); Yutaka Hasebe, Kuki (JP)

(73) Assignee: THE NIPPON SIGNAL CO., LTD. (JP)

( * ) Notice: Subject to any disclaimer, the term of this patent is extended or adjusted under 35 U.S.C. 154(b) by 282 days.

(21) Appl. No.: 17/771,036

(22) PCT Filed: Oct. 20, 2020

(86) PCT No.: PCT/JP2020/039453
§ 371 (c)(1),
(2) Date: Apr. 22, 2022

(87) PCT Pub. No.: WO2021/079889
PCT Pub. Date: Apr. 29, 2021

(65) Prior Publication Data
US 2022/0397538 A1 Dec. 15, 2022

(30) Foreign Application Priority Data

Oct. 25, 2019 (JP) .................................. 2019-194636
Oct. 25, 2019 (JP) .................................. 2019-194637

(51) Int. Cl.
*G01N 23/04* (2018.01)
*G01N 23/10* (2018.01)

(52) U.S. Cl.
CPC ............. *G01N 23/10* (2013.01); *G01N 23/04* (2013.01)

(58) Field of Classification Search
CPC .......... G01N 1/00; G01N 23/00; G01N 21/88; G01N 21/89; G01N 2021/8455; G01N 23/046; G01N 2223/419; G01N 2223/1016
See application file for complete search history.

(56) References Cited

U.S. PATENT DOCUMENTS

2004/0035928 A1*  2/2004  Anderson .............. G07B 15/00
                                                     235/385
2017/0266534 A1   9/2017  Watterson

FOREIGN PATENT DOCUMENTS

JP      H08-329316 A    12/1996
JP      H10-185841 A    7/1998
(Continued)

OTHER PUBLICATIONS

Taiwan Office Action dated May 18, 2022 including English translation for corresponding Taiwan Application No. 109136879 (4 pages).

(Continued)

*Primary Examiner* — Don K Wong
(74) *Attorney, Agent, or Firm* — Harness, Dickey & Pierce, P.L.C (57) ABSTRACT

A technique is provided to enable a baggage holder to smoothly place baggage on a conveyor belt. An inspection device inspects the baggage of a visitor using x-rays. A belt conveyor transports the baggage to an inspection device. On the surface of the belt, plural marks are printed at predetermined intervals along the transport direction. When the belt conveyor drives the belt, the marks move in the transport direction at the transport speed of the belt. When placing baggage on the belt, the visitor can easily perceive the status of the belt, such as its transport direction and speed. The inspection device may have a light emitter near the loading position where baggage should be placed on the belt, and the (Continued)

color of light from the light emitter may change to notify the visitor when baggage should be placed on the belt.

17 Claims, 6 Drawing Sheets

(56) References Cited

FOREIGN PATENT DOCUMENTS

| | | |
|---|---|---|
| JP | H11-0316562 A | 11/1999 |
| JP | 2009-256019 A | 11/2009 |
| JP | 6533330 B1 | 6/2019 |
| KR | 100981889 B1 | 9/2010 |

OTHER PUBLICATIONS

Office Action issued in the corresponding Japanese Patent Application No. 2019-194636; mailed on Jul. 25, 2023 (total 7 pages).
Office Action issued in the corresponding Japanese Patent Application No. 2019-194637; mailed on Jul. 25, 2023 (total 7 pages).
International Search Report (in English and Japanese) issued in PCT/JP2020/039453, mailed Dec. 15, 2020; ISA/JP (6 pages).
Office Action issued in the corresponding Taiwanese Patent Application No. 112104056; mailed on Dec. 13, 2023 (total 10 pages).
Office Action issued in the corresponding Japanese Patent Application No. 2019-194637; mailed on Oct. 24, 2023 (total 6 pages).
Decision of Refusal issued in the corresponding Japanese Patent Application No. 2019-194636; mailed on Oct. 24, 2023 (total 8 pages).

* cited by examiner

INSPECTION SYSTEM

TECHNICAL FIELD

This invention relates to inspection systems.

BACKGROUND ART

As a device for inspecting baggage, there is known in the art, for example, an X-ray baggage inspection device as disclosed in Patent Document 1. According to the disclosed X-ray baggage inspection device, baggage placed on a roller conveyor moves onto a belt conveyor that passes through a main body of the device. The main body of the device inspects the baggage by irradiating X-rays to the baggage placed on the belt conveyor. After passing through the main body of the device, the baggage is moved by the belt conveyor onto a roller conveyor positioned downstream of the belt conveyor in a direction of transport.

PRIOR ART DOCUMENT

Patent Document

Patent Document 1: JP Hei 10(1998)-185841A

Problem to be Solved by the Invention

An X-ray baggage inspection device can be used to prevent hazardous items from being brought into theme parks and event venues. To ensure continuous entry of visitors at such venues, it is preferable to conduct inspections in a short period of time. If visitors place their baggage on a belt conveyor and retrieve their baggage from the belt conveyor after completion of inspection, there is no need for conveyance of baggage between attendants and visitors, and thus a time required to complete inspection can be kept short.

A problem occurs, however, if a visitor hesitates to place their baggage on the belt conveyor because they misjudge timing of placement of their baggage, thereby causing a delay in inspection.

An object of the present invention is to provide a means that enables baggage to be timely placed on a belt conveyor.

SUMMARY

The present invention includes, as a first aspect, an inspection system comprising: an inspection device that inspects baggage, a continuously operating belt conveyor that transports the baggage, and an indication means that provides an indication at or near a loading position on a belt of the belt conveyor, where the baggage should be placed, to prompt a holder of the baggage to place the baggage on the belt.

According to the first aspect of the invention, the holder of the baggage is prompted to place the baggage on the continuously operating belt conveyor in response to an indication displayed by the indication means, thereby facilitating baggage placement and shortening an inspection time.

The present invention includes, as a second aspect, an inspection system according to the first aspect, wherein the indication means displays a marker that moves in a transport direction of the baggage at a speed corresponding to a transport speed of the belt of the continuously operating belt conveyor.

According to the second aspect of the invention, the baggage holder is able to perceive how quickly to place the baggage on the belt.

The present invention includes, as a third aspect, an inspection system according to the second aspect, wherein the indication means displays the marker on the belt.

The present invention includes, as a fourth aspect, an inspection system according to the second aspect further comprising: a protector to protect an edge of the belt in a widthwise direction, wherein the indication means displays the marker on the protector.

According to the third or fourth aspect of the invention, the baggage holder can perceive the transport direction and the transport speed of the belt.

The present invention includes, as a fifth aspect, an inspection system according to the third or fourth aspect, wherein the indication means displays the marker by projecting an image of the marker.

According to the fifth aspect of the invention, a function of displaying a marker can be easily incorporated in an existing belt conveyor.

The present invention includes, as a sixth aspect, an inspection system according to the second aspect, wherein the indication means has plural light-emitting elements aligned in the transport direction, and by emitting light the plural light-emitting elements display the marker.

The present invention includes, as a seventh aspect, an inspection system according to the sixth aspect further comprising: a protector to protect an edge of the belt in a widthwise direction, wherein the plural light-emitting elements are positioned on the protector.

According to the sixth or seventh aspect of the invention, for example, each of the plural light-emitting elements can sequentially emit light for a predetermined time at staggered intervals and then turn off so that the light as a whole appears to move in the transport direction at a speed corresponding to the transport speed of the belt. As a result, the baggage holder can perceive from the light the transport direction and the transport speed of the belt.

The present invention includes, as an eighth aspect, an inspection system according to the sixth aspect, wherein the belt is a light-transmitting belt, and the plural light-emitting elements are positioned inside of the belt.

According to the eighth aspect of the invention, the baggage holder can perceive the transport speed and transport direction of the belt by the light seen through the belt.

The present invention includes, as a ninth aspect, an inspection system according to any one of the second to eighth aspects, wherein the indication means displays the marker upstream in the transport direction as viewed from the inspection device, and downstream of the transport direction as viewed from the inspection device.

According to the ninth aspect of the invention, the baggage holder can perceive the status of the belt upstream from the inspection device and the status of the belt downstream from the inspection device.

The present invention includes, as a tenth aspect, an inspection system according to the first aspect, wherein the indication means displays a marker near the loading position indicating a timing when the baggage should be placed on the belt.

According to the tenth aspect of the invention, the baggage holder can perceive when to place the baggage on the belt.

The present invention includes, as a eleventh aspect, an inspection system according to the tenth aspect, wherein the indication means has plural light-emitting elements to display the marker.

According to the eleventh aspect of the invention, the light emitted from the light-emitting elements allows the baggage holder to perceive when to place the baggage on the belt.

The present invention includes, as a twelfth aspect, an inspection system according to the tenth or eleventh aspect, wherein the indication means displays the marker in accordance with a time at which the baggage holder should place the baggage on the belt.

According to the twelfth aspect of the invention, the baggage holder can perceive a wait time before the baggage can be placed on the belt.

The present invention includes, as a thirteenth aspect, an inspection system according to any one of the tenth to twelfth aspects, further comprising: a protector to protect an edge of the belt in a widthwise direction, wherein the indication means displays the marker on the protector.

According to the thirteenth aspect of the invention, without making any changes to the belt, it is possible to notify the baggage holder of a time before the baggage can be placed on the belt.

DETAILED DESCRIPTION

First Exemplary Embodiment

Figure 1:
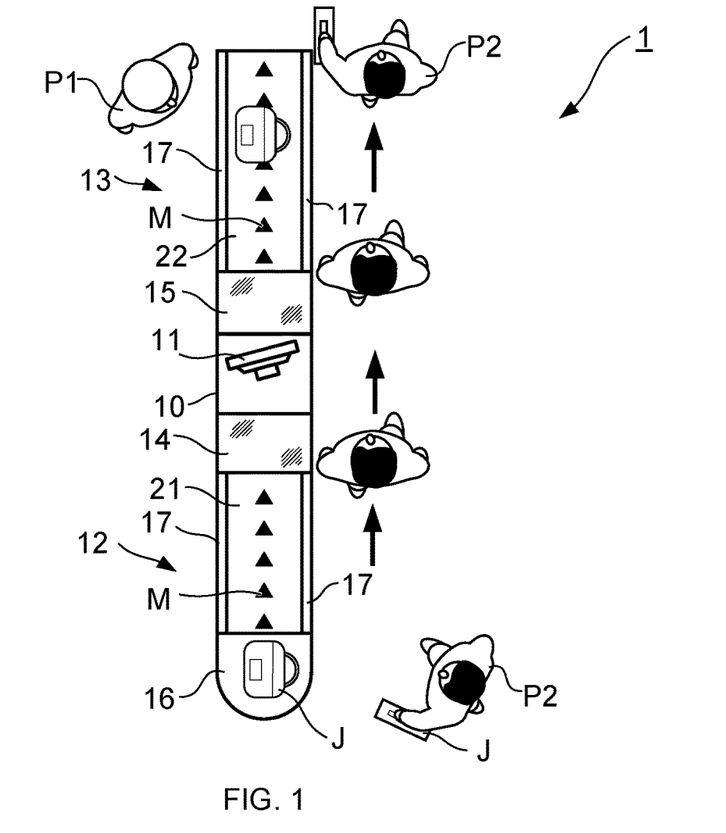
FIG. 1 shows an example of Inspection System 1 according to an exemplary embodiment of the present invention.
Figure 2:
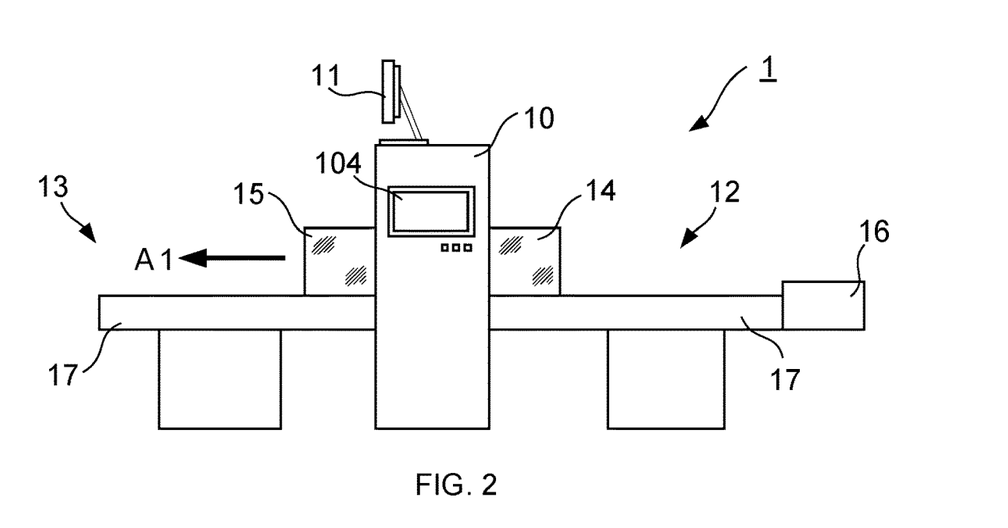
FIG. 2 shows a horizontal view of Inspection System 1 according to an exemplary embodiment of the present invention.

FIG. 1 shows an example of Inspection System 1 according to an exemplary embodiment of the present invention viewed from above. FIG. 2 shows a horizontal view of Inspection System 1. Inspection System 1 is a system that inspects Baggage J of Visitor P2 (an example of a baggage holder) entering a theme park, museum, concert hall, baseball stadium, gymnasium, event venue, etc. Inspection System 1 is installed, for example, at an entrance to the theme park, etc., or any other place where the contents of Baggage J of Visitor P2 need to be inspected.

Inspection System 1 has Inspection Device 10, Display 11, First Belt Conveyor 12, Second Belt Conveyor 13, First Cover 14, Second Cover 15 and Loading Table 16. Inspection System 1 is an example of an inspection system according to the present invention.

Loading Table 16 is a table on which Baggage J of Visitor P2 is placed. Loading Table 16 has a semi-circular section and is positioned adjacent to the upstream end of First Belt Conveyor 12 in the transport direction. The shape of Loading Table 16 viewed from above is not limited to the shape shown in FIG. 1, and may be any other shape.

First Belt Conveyor 12 is a conveyor that transports Baggage J in Transport Direction A1 and is positioned upstream of Transport Direction A1 as seen from Inspection Device 10. First Belt Conveyor 12 has Belt 21 that is a rotating endless belt, and a drive unit (not shown) equipped with a motor and rollers that drive Belt 21. First Belt Conveyor 12 transports Baggage J on Belt 21 to Inspection Device 10.

On the surface of Belt 21 (an example of an indication means), a plurality of Marks M are formed at predetermined intervals along Transport Direction A1. Mark M is an example of a marker according the present invention. Mark M is a triangular mark formed by paint of a different color than the color of Belt 21 in this embodiment. However, the shape of Mark M is not limited to a triangle, and can be a circle, an oval, or polygon. Instead of by printing, Mark M can be formed on the surface of Belt 21 by bonding to the surface of Belt 21 in a pre-determined shape a flexible material that is of a different color than the color of Belt 21.

First Cover 14 and Second Cover 15 are U-shaped covers made of transparent acrylic panels that prevent objects other than Baggage J, such as a hand of Visitor P2, from entering Inspection Device 10. First Cover 14 is provided on First Belt Conveyor 12 in contact with Inspection Device 10. Second Cover 15 is provided on Second Belt Conveyor 13 in contact with Inspection Device 10.

Inspection Device 10 is a device that uses X-rays to inspect the interior of Baggage J that has been transported by First Belt Conveyor 12. Inspection Device 10 has a sensor that detects whether Baggage J is inside Inspection Device 10. When Baggage J is inside Inspection Device 10, Inspection Device 10 irradiates Baggage J with X-rays and detects X-rays transmitted through Baggage J. Inspection Device 10 displays a fluoroscopic image of the interior of Baggage J on Display 11 based on the detected X-rays. Inspection Device 10 detects predetermined types of objects as hazardous items. When Inspection Device 10 detects hazardous items in Baggage J by X-ray fluoroscopy, it notifies Attendant P1 via Display 11 that it has detected hazardous items.

Second Belt Conveyor 13 is a conveyor that transports Baggage J to transport direction A1 after inspection at Inspection Device 10, and is positioned downstream of Transport Direction A1 as viewed from Inspection Device 10. Second Belt Conveyor 13 has Belt 22 that is a rotating endless belt, and a drive unit (not shown) with a motor and rollers that drive Belt 22. If no hazardous items are detected in Baggage J, Visitor P2 picks up Baggage J transported by Second Belt Conveyor 13. Attendant P1 stands near to Second Belt Conveyor 13, and checks the contents of Baggage J when it is reported on Display 11 that there are one or more hazardous items in Baggage J or when one or more hazardous items are identified in the image of Baggage J displayed on Display 11. In this embodiment, Marks M are also formed on the surface of Belt 22 at predetermined intervals along Transport Direction A1. However, Marks M may not be formed on the surface of Belt 22.

Protectors 17 are members that protect the ends of both sides of Belt 21 in a widthwise direction, and the ends of both sides of Belt 22 in a widthwise direction.

Figure 3:
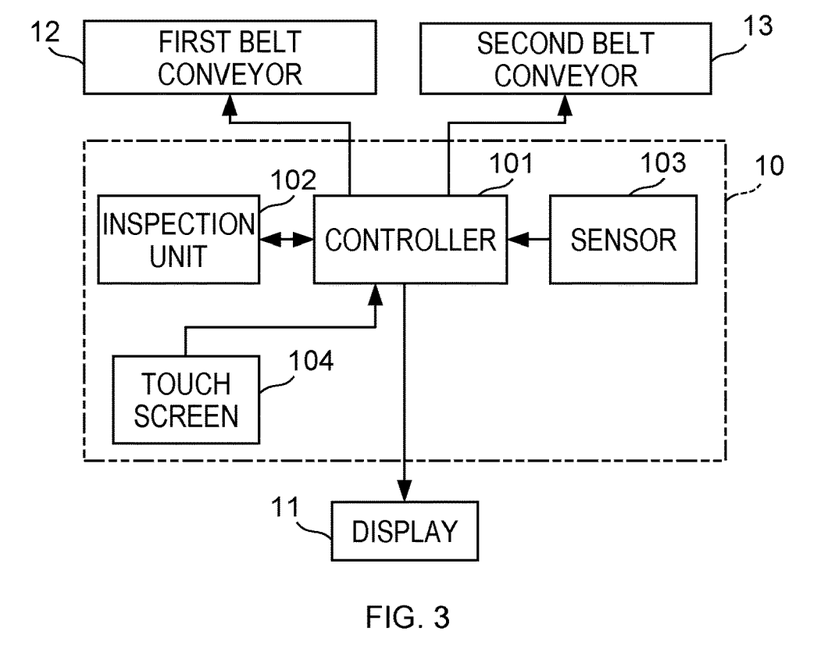
FIG. 3 shows a hardware configuration of Inspection Device 10 according to an exemplary embodiment of the present invention.

FIG. 3 shows an example of a hardware configuration of Inspection Device 10. Controller 101 has a Central Processing Unit (CPU), storage and memory. The functional configuration of Inspection Device 10 is realized by the CPU reading the program (software) stored in the storage via the memory, performing data processing according to the program, and controlling connected components.

For example, Controller 101 controls First Belt Conveyor 12 to convey Baggage J placed on Belt 21 to Inspection Unit 102. Controller 101 controls Inspection Unit 102 to inspect Baggage J. Controller 101 controls Second Belt Conveyor 13 to convey Baggage J downstream after it has been inspected.

Sensor 103 is a sensor that detects whether Baggage J is present inside Inspection Device 10. If Baggage J is not present inside Inspection Device 10, Sensor 103 outputs a first signal to Controller 101 indicating absence of Baggage J inside Inspection Device 10. If Baggage J is present inside Inspection Device 10, Sensor 103 outputs a second signal to Controller 101 indicating presence of Baggage J inside Inspection Device 10.

Inspection Unit 102 has an irradiation device (not shown) that irradiates X-rays to Baggage J and a detector (not shown) that detects X-rays irradiated from the irradiation device and transmitted through Baggage J. Inspection Unit 102 generates a fluoroscopic image of the interior of Baggage J based on the X-rays detected by the detector. The fluoroscopic image generated by Inspection Unit 102 is supplied to Controller 101 and displayed on Display 11 under the control of Controller 101. Inspection Unit 102, for example, analyzes the fluoroscopic image of the interior of Baggage J using a well-known image analysis method to detect predetermined hazardous items such as knives. If Inspection Unit 102 detects one or more hazardous items in Baggage J, Inspection Unit 102 supplies a notice to Controller 101 indicating presence of hazardous items, and if no hazardous items are detected in Baggage J, Inspection Unit 102 supplies a notice to Controller 101 indicating absence of hazardous items. Under control of Controller 101, Display 11 displays that one or more hazardous items have been detected if the notice indicating presence of hazardous items is supplied to Controller 101, and displays that no hazardous items have been detected if the notice indicating absence of hazardous items is supplied to Controller 101.

Touch Screen 104 displays a Graphical User Interface (GUI) by which Attendant P1 operates Inspection System 1 under control of Controller 101. When Touch Screen 104 is operated by Attendant P1, Controller 101 controls each component of Inspection Device 10 and performs various data processing in accordance with an operation made by Attendant P1 on Touch Screen 104.

Visitor P2 places Baggage J on Loading Table 16 before placing Baggage J on Belt 21. First Belt Conveyor 12 is controlled by Controller 101 and rotates Belt 21 to transport Baggage J, which is placed on Belt 21 in Transport Direction A1. That is, viewing Inspection System 1 as shown in FIG. 2, Controller 101 rotates Belt 21 counterclockwise. Since Marks M are formed on the surface of Belt 21, Marks M move in Transport Direction A1 at the transport speed of Belt 21.

Since Marks M move in Transport Direction A1 at the transport speed of Belt 21, Visitor P2 can easily perceive a status of Belt 21, including its transport direction and transport speed, when placing Baggage J on Belt 21. Accordingly, Visitor P2 can place Baggage J on Belt 21 without hesitating.

Second Belt Conveyor 13 is controlled by Controller 101 and rotates Belt 22 to transport Baggage J on Belt 22 in Transport Direction A1. That is, viewing Inspection System 1 as shown in FIG. 2, Controller 101 rotates Belt 22 counterclockwise. Since Marks M are formed on the surface of Belt 22, Marks M move in Transport Direction A1 at the transport speed of Belt 22.

Since Marks M move in Transport Direction A1 at the transport speed of Belt 22, Visitor P2 can easily perceive a status of Belt 22, including its transport direction and transport speed, when picking up Baggage J from Belt 22. Accordingly, Visitor P2 can pick up baggage J from Belt 22 without hesitation.

Second Exemplary Embodiment

The second exemplary embodiment of the present invention is described next. In the second embodiment, Inspection System 1 is equipped with Inspection Device 10A instead of Inspection Device 10. The second embodiment differs from the first embodiment in that Marks M are not printed on the surface each of Belt 21 and Belt 22. In the following description, explanations of the same components of the second embodiment as those of the first embodiment are omitted. In other words, in the following description, only points in which the second embodiment differs from the first embodiment are explained.

Figure 4:
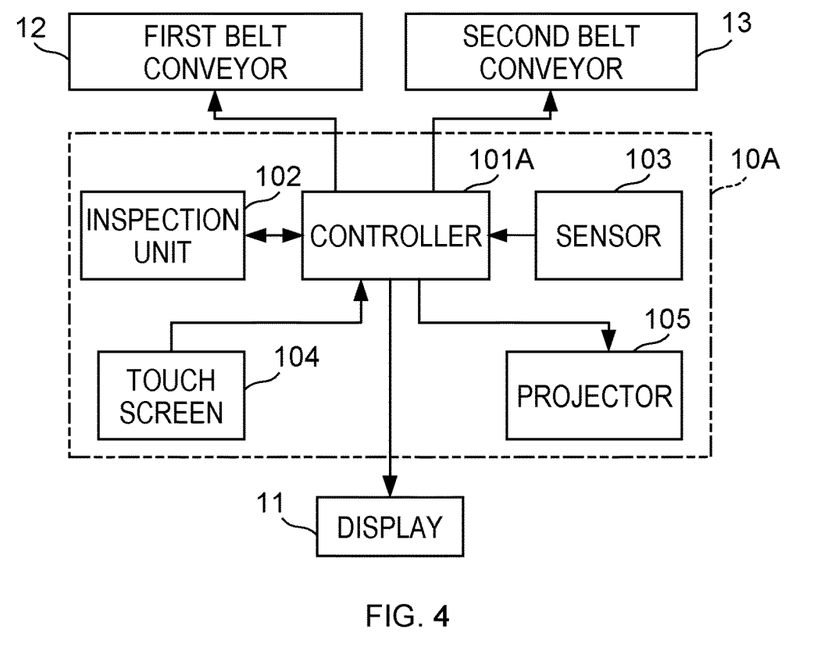
FIG. 4 shows a hardware configuration of Inspection Device 10A according to an exemplary embodiment of the present invention.

FIG. 4 shows an example of a hardware configuration of Inspection Device 10A according to the second embodiment. Inspection Device 10A differs from Inspection Device 10 of the first embodiment in that it is equipped with Controller 101A and Projector 105 (which constitute an example of an indication means together with Belt 21 and 22). Projector 105 is an LCD projector, and projects images of Marks M onto the surface each of Belt 21 and Belt 22 under control of Controller 101A. Projector 105 may be configured to project the images of Marks M onto the surface of Belt 21 only, and not onto the surface of Belt 22.

Visitor P2 places Baggage J on Loading Table 16 before placing Baggage J on Belt 21. First Belt Conveyor 12 rotates Belt 21 to transport Baggage J placed on Belt 21 in Transport Direction A1 under control of Controller 101A. Second Belt Conveyor 13 rotates Belt 22 to transport Baggage J on Belt 22 in Transport Direction A1 under control of Controller 101A.

Controller 101A controls Projector 105 to project the images of Marks M onto the surface of Belt 21 and move the projected images in Transport Direction A1 at the transport speed of Belt 21. Controller 101A controls Projector 105 to project the images of Marks M onto the surface of Belt 22 and move the projected images in Transport Direction A1 at the transport speed of Belt 22.

Since the images of Marks M move in Transport Direction A1 at the transport speed of Belt 21, Visitor P2 can easily perceive a status of Belt 21, including its transport direction and transport speed, when placing Baggage J on Belt 21. Accordingly, Visitor P2 can place Baggage J on Belt 21 without hesitation. Moreover, since the images of Marks M move in Transport Direction A1 at the transport speed of Belt 22, Visitor P2 can easily perceive a status of Belt 22, including its transport direction and transport speed, when picking up Baggage J from Belt 22. Accordingly, Visitor P2 can pick up baggage J from Belt 22 without hesitation.

In the second embodiment, Projector 105 may also project an image of a frame indicating a location where Baggage J should be placed on Belt 21 close to Loading Table 16. In the second embodiment, images of Marks M may be projected onto the top surfaces of Protectors 17 instead of onto the surfaces each of Belt 21 and Belt 22.

Third Exemplary Embodiment

Figure 5:
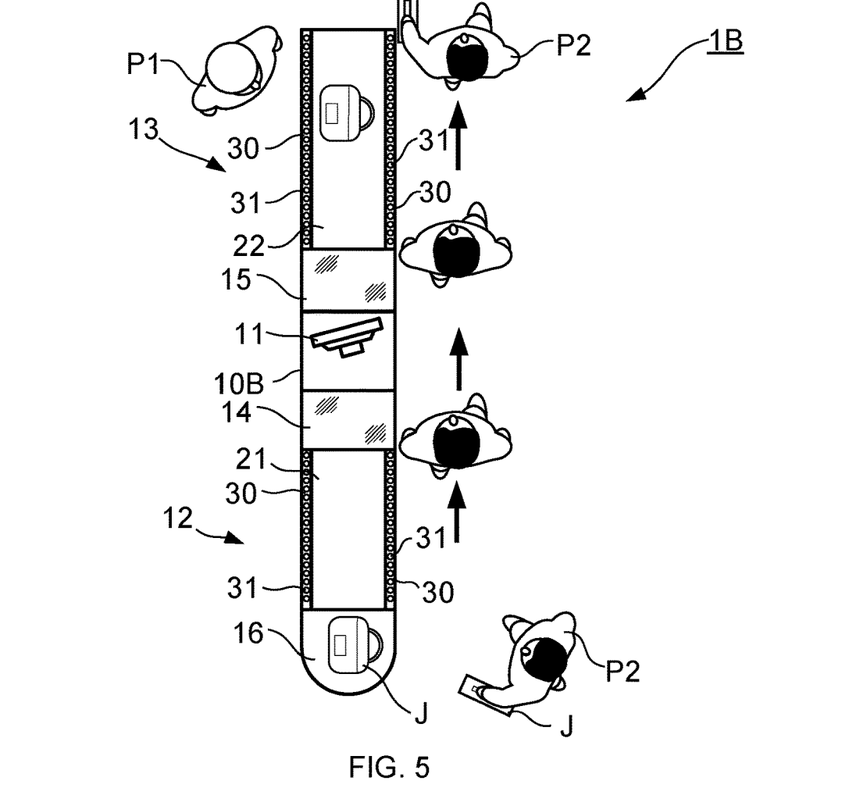
FIG. 5 shows an example of Inspection System 1B according to an exemplary embodiment of the present invention.

The third exemplary embodiment of the present invention is described next. FIG. 5 shows Inspection System 1B according to the third embodiment viewed from above. Inspection System 1B differs from Inspection System 1 of the first embodiment in that Marks M are not printed on the surface each of Belt 21 and Belt 22, and is equipped with Light Emitters 30 (an example of an indication means). Furthermore, Inspection System 1B differs from Inspection System 1 in that it is equipped with Inspection Device 10B instead of Inspection Device 10. In the following description, explanations of the same components of the third embodiment as those of the first embodiment are omitted. In other words, in the following description, only points in which the third embodiment differs from the first embodiment are explained.

Each Light Emitter 30 has plural Light-emitting Elements 31. Each Light-emitting Element 31 of Light Emitter 30 is, for example, a light-emitting diode that emits green light. Light Emitters 30 are provided on Protectors 17, and members are provided that protect the ends of both sides of Belt 21 in a widthwise direction, and the ends of both sides of Belt 22 in a widthwise direction. Plural Light-emitting Elements 31 are arranged in rows along Transport Direction A1.

In this embodiment, Light Emitters 30 are provided on each of a first end of Protector 17 and a second end of Protector 17 in the widthwise direction of Belt 21. However, Light Emitter 30 may be provided only on the first end of Protector 17, with no Light Emitter 30 provided on the second end of Protector 17. In this embodiment, Light Emitters 30 are provided on each of the first end of Protector 17 and on the second end of Protector 17 in the widthwise direction of Belt 22. However, Light Emitter 30 may be provided only on the first end of Protector 17 with no Light Emitter 30 provided on the second end of Protector 17. In this embodiment, Light Emitters 30 are provided on each of Protector 17 of First Belt Conveyor 12 and Protector 17 of Second Belt Conveyor 13. However, Light Emitters 30 may be provided only on Protector 17 of First Belt Conveyor 12 with no Light Emitter 30 provided on Protector 17 of Second Belt Conveyor 13. In other words, Light Emitters 30 may be provided upstream of Inspection Device 10 in Transport Direction A1, and Light Emitter 30 may not be provided downstream of Inspection Device 10 in Transport Direction A1. In this embodiment, the color of light emitted from Light-emitting Element 31 is not limited to green, and may be any other color. Also, in this embodiment Light Emitter 30 may be configured to have plural green light bulbs instead of plural light-emitting diodes, for example.

Figure 6:
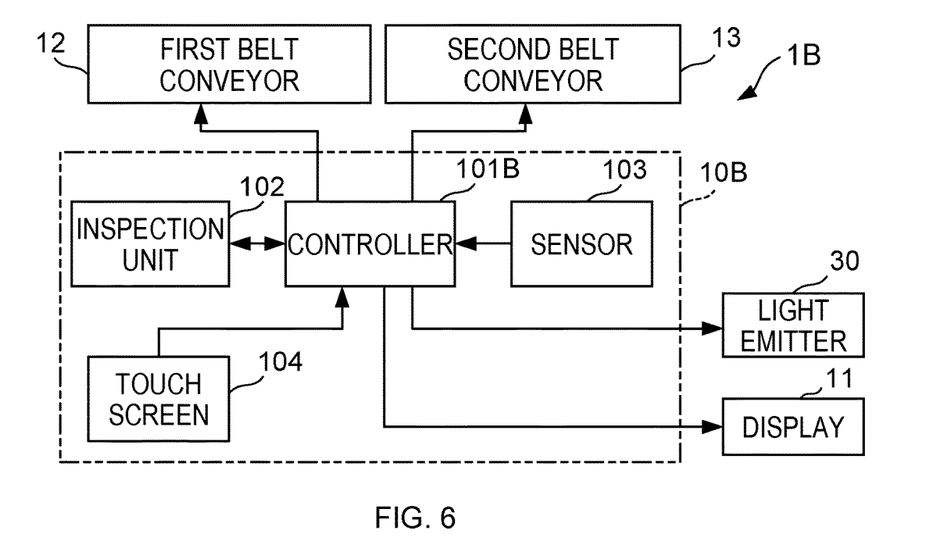
FIG. 6 shows a hardware configuration of Inspection Device 10B according to an exemplary embodiment of the present invention.

FIG. 6 shows an example of the hardware configuration of Inspection Device 10B. Inspection Device 10B differs from Inspection Device 10 of the first embodiment in that it is equipped with Controller 101B for controlling Light Emitters 30.

Visitor P2 places Baggage J on Loading Table 16 before placing Baggage J on Belt 21. First Belt Conveyor 12 rotates Belt 21 to transport Baggage J placed on Belt 21 in Transport Direction A1 under the control of Controller 101B. Second Belt Conveyor 13 rotates Belt 22 to transport Baggage J on Belt 22 in Transport Direction A1 under the control of Controller 101B.

Figure 7A:
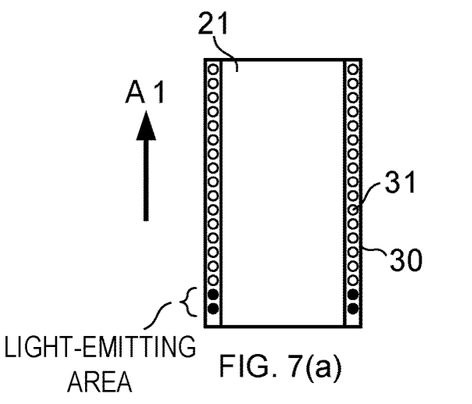
FIGS. 7(a)-(e) show an example of operation of Inspection System 1 according to an exemplary embodiment of the present invention.

Controller 101B controls Light Emitters 30 and manages which Light-emitting Elements 31 emit light in accordance with the transport speed of Belt 21. For example, Controller 101B turns on two Light-emitting Elements 31 from the upstream end in Transport Direction A1 and turns off other Light-emitting Elements 31, as shown in FIG. 7(a). For convenience of explanation, the area in Light Emitter 30 where Light-emitting Elements 31 emit light is referred to as the light-emitting area. The light-emitting area is an example of a marker according to the present invention.

Figure 7B:
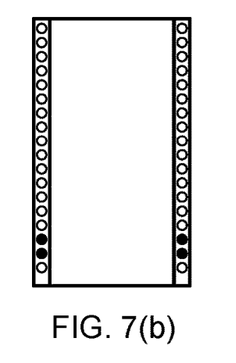
Figure 7C:
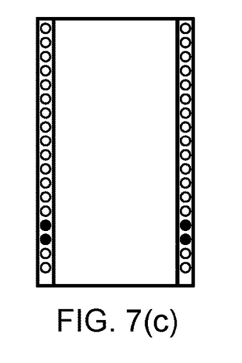

Controller 101B changes Light-emitting Elements 31 that emit light as shown in FIG. 7(b), and then changes Light-emitting Elements 31 that emit light as shown in FIG. 7(c), in accordance with a transport speed of Belt 21. As a result, the light-emitting area moves in Transport Direction A1. In Light Emitters 30 on First Belt Conveyor 12, a speed of movement of the light-emitting area is the same as the transport speed of Belt 21.

Figure 7D:
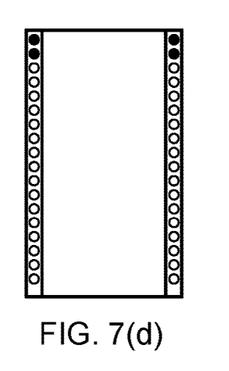
Figure 7E:
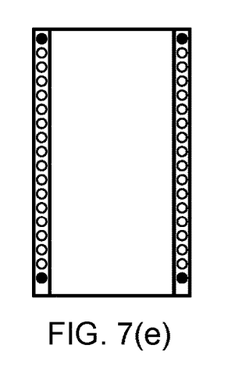

When the light-emitting area reaches the downstream end in Transport Direction A1 of Belt 21 as shown in FIG. 7(d), Controller 101B changes Light-emitting Elements 31 to be lit as shown in FIG. 7(e) and then as shown in FIG. 7(a). Controller 101B repeatedly moves the light-emitting area from the upstream side to the downstream side in Transport Direction A1. Controller 101B also performs the control described above for Light Emitters 30 on Protectors 17 provided for Second Belt Conveyor 13. In Light Emitters 30 on Second Belt Conveyor 13, the speed of movement of the light-emitting area is the same as the transport speed of Belt 22.

According to the third embodiment, since the light-emitting area moves in Transport Direction A1 at the transport speed of Belt 21, Visitor P2 can easily perceive the status of Belt 21, including its transport direction and transport speed, when placing Baggage J on Belt 21. Accordingly, Visitor P2 can place Baggage J on Belt 21 without hesitating. Further, since the light-emitting area moves in Transport Direction A1 at the transport speed of Belt 22, Visitor P2 can easily perceive the status of Belt 22, including its transport direction and transport speed and, when picking up Baggage J from Belt 22. Accordingly, Visitor P2 can pick up baggage J from Belt 22 without hesitating.

The number of Light-emitting Element 31 emitting light to form the light-emitting area in one Light Emitter 30 is not limited to two as shown in FIGS. 7(a)-(e), and one or three or more Light-emitting Elements 31 may emit light to form the light-emitting area. The number of light-emitting areas formed in one Light Emitter 30 is not limited to one. For example, Controller 101B may form plural light-emitting areas at intervals.

Fourth Exemplary Embodiment

Figure 8:
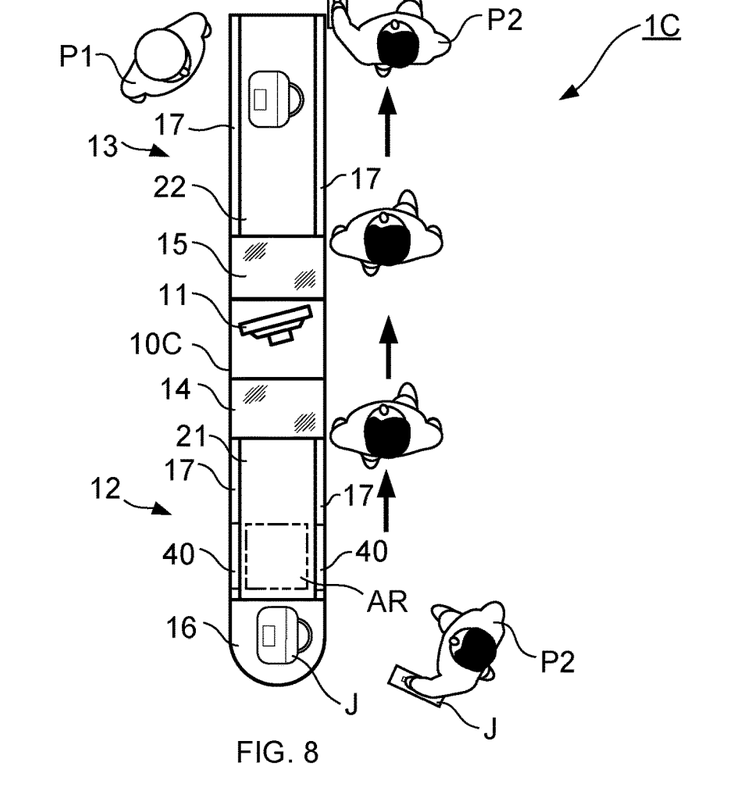
FIG. 8 shows an example of Inspection System 1C according to an exemplary embodiment of the present invention.
Figure 9:
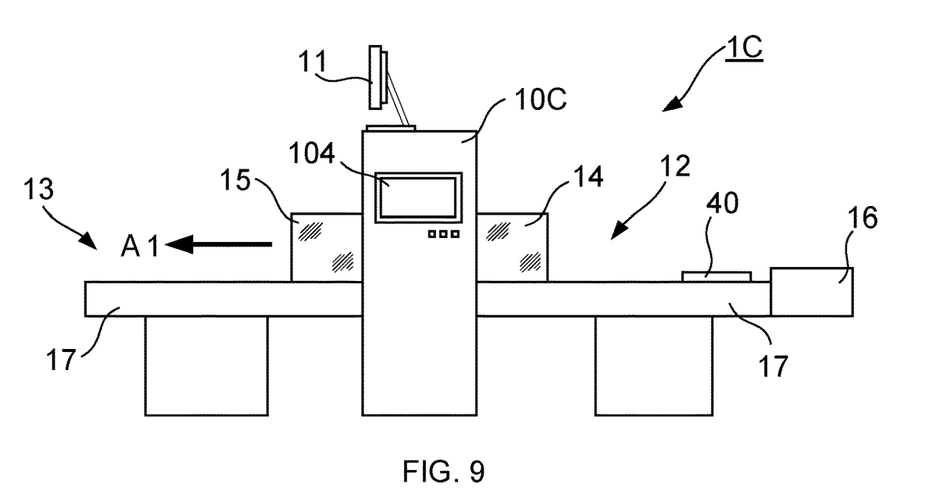
FIG. 9 shows a horizontal view of Inspection System 1C according to an exemplary embodiment of the present invention.

The fourth exemplary embodiment of the present invention is described next. FIG. 8 shows an example of Inspection System 1C according to the fourth embodiment, viewed from above. FIG. 9 shows Inspection System 1C from the side. In the following description, explanations of the same components of the fourth embodiment as those of the first embodiment are omitted. In other words, in the following description, only points in which the fourth embodiment differs from the first embodiment are explained.

Inspection Device 10C of Inspection System 1C according to the fourth embodiment differs from Inspection Device 10 of Inspection System 1 according to the first embodiment in that Marks M are not printed on the surface each of Belt 21 and Belt 22.

Further, Inspection System 1C according to the fourth embodiment differs in that it has Light Emitters 40 (an example of an indication means), which Inspection System 1 according to the first embodiment does not have.

Area AR shown in FIG. 8 is an area in a predetermined range from the upstream side to the downstream side in Transport Direction A1 of First Belt Conveyor 12. Area AR is an example of a loading position of the present invention. Namely, Area AR is the area where Visitor P2 places Baggage J.

Each of Light Emitters 40 has plural light-emitting elements. Each of the plural light-emitting elements is, for example, a light-emitting diode. Each of Light Emitters 40 has plural light-emitting diodes that emit green light and plural light-emitting diodes that emit red light. Light Emitter 40 is positioned on Protector 17, a member that protects one of two ends in the widthwise direction of Belt 21, and near Area AR. In this embodiment, Light Emitters 40 are provided on Protector 17 on each of a first end and a second end in the widthwise direction of Belt 21. However, only one Light Emitter 40 may be provided on Protector 17 on either the first end or the second end. Light Emitter 40 emits green light when Baggage J is permitted to be placed in Area AR and red light when Baggage J is not permitted to be placed in Area AR. Light Emitter 40 is an example of the marker of the present invention. The light-emitting diode of Light Emitter 40 is an example of a light-emitting element of the present invention. Protector 17 is an example of a member positioned near the loading position.

Figure 10:
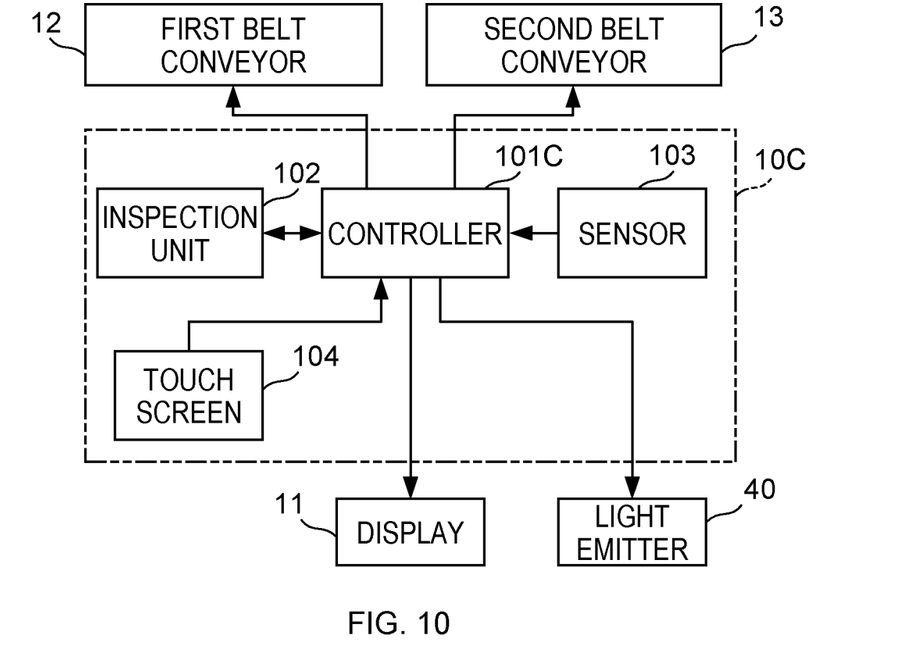
FIG. 10 shows a hardware configuration of Inspection Device 10C according to an exemplary embodiment of the present invention.

FIG. 10 shows an example of the hardware configuration of Inspection Device 10C. Inspection Device 10C differs from Inspection Device 10 according to the first embodiment in that Controller 101C controls Light Emitters 40.

Figure 11:
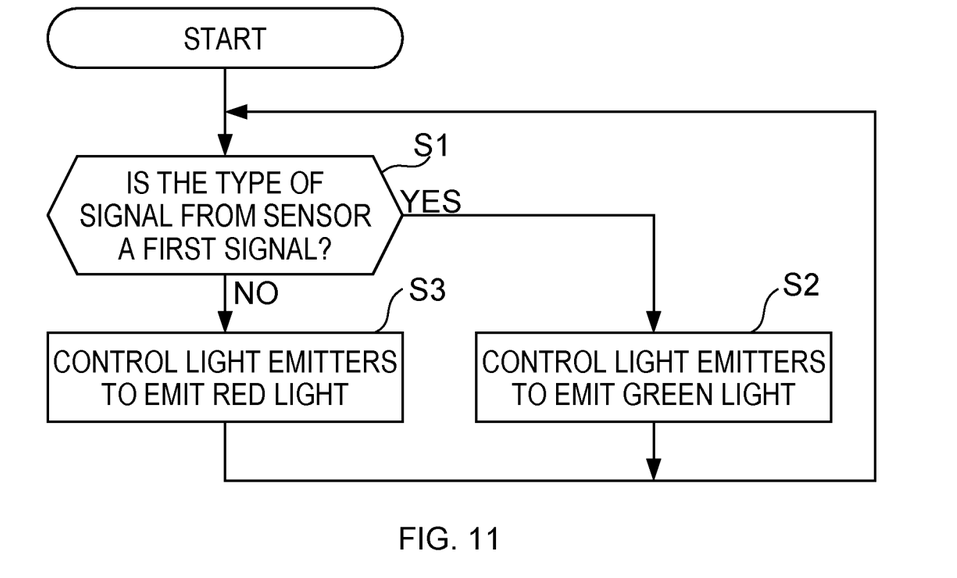
FIG. 11 shows a flow of processing performed by Controller 101C according to an exemplary embodiment of the present invention.

Next, an example of the operation of the fourth embodiment will be described. Visitor P2 places Baggage J on Loading Table 16 before placing Baggage J on Belt 21. Controller 101C controls a color of light emitted from Light Emitters 40 to notify Visitor P2 when to place Baggage J in Area AR. FIG. 11 is an example of a processing flow performed by Controller 101C to control Light Emitters 40.

Controller 101C judges whether the type of signal provided from Sensor 103 is a first signal (Step S1). When the type of signal provided from Sensor 103 is the first signal (YES at Step S1), Controller 101C controls Light Emitters 40 to emit green light (Step S2). Light Emitters 40 turn off the light-emitting diodes that emit red light and turn on the light-emitting diodes that emit green light to emit green light under control of Controller 101C. Light Emitters 40 continue to emit green light until a next instruction is received from Controller 101C. Controller 101C returns the process flow to Step S1 after Step S2. Emission of green light from Light Emitters 40 notifies Visitor P2 that it is permitted to place Baggage J on Belt 21.

When green light is emitted from Light Emitters 40, Visitor P2 places Baggage J on Belt 21. After Visitor P2 places Baggage J on Belt 21, Baggage J is transported into Inspection Device 10 by driven Belt 21.

After Baggage J enters Inspection Device 10, Sensor 103 provides a second signal to Controller 101C. When the type of signal provided from Sensor 103 changes from the first signal to the second signal, Controller 101C judges NO at Step S1. When Controller 101C judges NO at Step S1, Light Emitters 40 are controlled to emit red light (Step S3). Thus, under the control of Controller 101C, Light Emitters 40 turn off the light-emitting diodes that emit green light and turn on the light-emitting diodes that emit red light. Light Emitters 40 continue to emit red light until they receive a next instruction from Controller 101C. Controller 101C returns the process flow to Step S1 after Step S3. Emission of green light from Light Emitters 40 notifies Visitor P2 that it is permitted to place Baggage J on Belt 21. Emission of red light from Light Emitters 40 notifies a visitor waiting to place baggage on Belt 21 after Visitor P2 that it is not yet permitted to place the baggage on Belt 21.

Baggage J transported into Inspection Device 10 by Belt 21 is inspected by Inspection Device 10. Under control of Inspection Device 10, Display 11 displays a fluoroscopic image of the interior of Baggage J and a detection result of predetermined hazardous items.

After the inspection of Baggage J by Inspection Unit 102 is completed, Second Belt Conveyor 13 transports the inspected Baggage J outside of Inspection Device 10 under control of Controller 101C. If no hazardous items are detected in Baggage J, Visitor P2 picks up Baggage J transported by Second Belt Conveyor 13. Attendant P1 checks the contents of Baggage J when it is reported on Display 11 that there are one or more hazardous items in Baggage J or when one or more hazardous items are identified in the image of Baggage J displayed on Display 11.

After Baggage J is transported outside of Inspection Device 10 by Second Belt Conveyor 13 and when the inside of Inspection Device 10 becomes empty, Sensor 103 provides the first signal to Controller 101C. When the type of signal provided from Sensor 103 changes from the second signal to the first signal (YES at Step S1), Controller 101C controls Light Emitters 40 to emit green light (Step S2). Under control of Controller 101C, Light Emitters 40 turn off the light-emitting diodes that emit red light and turn on the light-emitting diodes that emit green light. Emission of green light from Light Emitters 40 notifies the visitor waiting to place the baggage on Belt 21 after Visitor P2 that it is permitted to place the baggage on Belt 21.

According to the fourth embodiment, since an appropriate timing for placing baggage on Belt 21 is notified to visitors by Light Emitters 40, the visitors can place baggage on Belt 21 at an appropriate timing.

Modification

The present invention is not limited to the above-described exemplary embodiments, and can be implemented in various other embodiments. For example, the above embodiments may be modified to implement the present invention as follows. Two or more of the above-described embodiments and the following modifications may be combined.

In the embodiment described above, Inspection System 1 is equipped with Loading Table 16. However, Inspection System 1 may also not be equipped with Loading Table 16. In the embodiment described above, Loading Table 16 is positioned close to the upstream end of First Belt Conveyor 12 in the transport direction. However, Loading Table 16 may also be positioned close to one end of Belt 21 in the widthwise direction. To facilitate movement of Baggage J to Belt 21, plural rotating rollers may be provided in Loading Table 16. Loading Table 16 may be positioned to cover the upstream end of the transport direction of First Belt Conveyor 12.

In the third embodiment described above, Light Emitters 30 are positioned on Protectors 17 of First Belt Conveyor 12 and Protectors 17 of Second Belt Conveyor 13. Instead, Belt 21 and Belt 22 may each be made of a translucent material through which light is transmitted, and Light Emitters 30 may be positioned inside of Belt 21 and Belt 22 to emit green or red light through Belt 21 and Belt 22 toward the outside of Belt 21 and Belt 22.

In the second embodiment described above, the speed at which the images of Marks M projected on Belt 21 move is the same as the transport speed of Belt 21, and the speed at which the images of Marks M projected onto Belt 22 move is the same as the transport speed of Belt 22. However, the speed at which the images of Marks M move is not limited to that of the transport speed of the belt onto which the images are projected. For example, the speed at which the images of Marks M projected onto Belt 21 move may be within a predetermined range from the transport speed of Belt 21, and the speed at which the images of Marks M projected onto Belt 22 move may be within a predetermined range from the transport speed of Belt 22. Namely, the speed at which the images of Marks M move may not be the same as the transport speed of the belt onto which the images are projected.

In the first embodiment, as a marker to indicate the transport speed of Belt 21 or Belt 22, polygonal Marks M are formed on Belt 21 or Belt 22 in a row in the transport direction. Instead, a pattern may be formed on Belt 21 or Belt 22 as a marker to indicate the transport speed of Belt 21 or Belt 22. The pattern may be formed by providing surface irregularities on Belt 21 or Belt 22. Polygonal Marks M may also be formed by the surface irregularities on Belt 21 or Belt 22. The marker to indicate the transport speed of Belt 21 or Belt 22 may be formed by plural holes penetrating from the surface to the underside of Belt 21 or Belt 22.

The transport speed of Belt 21 and the transport speed of Belt 22 need not be the same. For example, the transport speed of Belt 22 may be slower than that of Belt 21. In this case, Visitor P2 can pick up Baggage J from Belt 22 more easily than in the case where the transport speed of Belt 22 is the same as that of Belt 21.

The images of Marks M may be formed on Belt 21 or Belt 22 by irradiation by a laser beam.

In the fourth embodiment, a cover covering the upstream end of the transport direction of Belt 21 may be provided on First Belt Conveyor 12, and Light Emitter 40 may be installed on the cover.

In the fourth embodiment, Light Emitters 40 are positioned on Protectors 17. Instead, Belt 21 may be a translucent belt through which light is transmitted, and Light Emitter 40 may be positioned inside of Belt 21 to emit green or red light through Belt 21 toward the outside of Belt 21.

In the fourth embodiment, Inspection System 1 may have a sensor that detects Baggage J in the range between Area AR and Inspection Device 10 on Belt 21, and Light Emitters 40 may emit red light during the period when Baggage J is detected by the sensor.

In the fourth embodiment, Light Emitters 40 emit green or red light in response to the type of signal provided from Sensor 103. The color of the light emitted from Light Emitters 40 is not limited to green and red. For example, Light Emitters 40 may emit blue light instead of green light, or yellow light instead of red light.

In the fourth embodiment, Light Emitters 40 have light-emitting diodes that emit green or red light. Elements that emit green or red light are not limited to light-emitting diodes. For example, instead of light-emitting diodes, Light Emitters 40 may have green-light bulbs and red-light bulbs, and these bulbs may be controlled to turn on and off so that Lights Emitter 40 emit green or red light in response to the type of signal provided from Sensor 103.

In the fourth embodiment, light emitted from Light Emitters 40 is used to notify visitors when it is permitted to place baggage on Belt 21. The configuration for notifying the visitors when it is permitted to place the baggage on Belt 21 is not limited to light. For example, a sign with one green surface and one red surface, rotatably positioned on Protector 17, may be used to inform the visitors when it is permitted to place the baggage on Belt 21. In a case that Controller 101 determines YES at Step S1, Controller 101 rotates the sign board so that the green surface is facing upward, and in a case that Controller 101 determines NO at Step S1, Controller 101 rotates the sign board so that the red surface is facing upward. By viewing the green surface of the sign board, the visitors are notified that it is permitted to place the baggage on Belt 21.

In the fourth embodiment, Inspection Device 10 may calculate a time required for Baggage J in Inspection Device 10 to exit outside of Inspection Device 10, and display the calculated time. In this case, Light Emitters 40 may operate according to a time remaining before Baggage J moves out of Inspection device 10. For example, while Light Emitters 40 are emitting red light, when a time for Baggage J to move outside of Inspection Device 10 is less than 5 seconds, Light Emitters 40 may emit flashing red light.

The invention claimed is:

1. An inspection system comprising:
   an inspection device that inspects baggage,
   a continuously operating belt conveyor that transports the baggage, and
   an indication means that provides an indication at or near a loading position on a belt of the belt conveyor, where the baggage should be placed, to prompt a holder of the baggage to place the baggage on the belt.

2. An inspection system according to claim 1, wherein the indication means displays a marker that moves in a transport direction of the baggage at a speed corresponding to a transport speed of the belt of the continuously operating belt conveyor.

3. An inspection system according to claim 2, wherein the indication means displays the marker on the belt.

4. An inspection system according to claim 2 further comprising:
   a protector to protect an edge of the belt in a widthwise direction,
   wherein
   the indication means displays the marker on the protector.

5. An inspection system according to claim 3, wherein the indication means displays the marker by projecting an image of the marker.

6. An inspection system according to claim 2, wherein the indication means has plural light-emitting elements aligned in the transport direction, and
   by emitting light the plural light-emitting elements display the marker.

7. An inspection system according to claim 6 further comprising:
a protector to protect an edge of the belt in a widthwise direction,
wherein
the plural light-emitting elements are positioned on the protector.

8. An inspection system according to claim 6, wherein
the belt is a light-transmitting belt, and
the plural light-emitting elements are positioned inside of the belt.

9. An inspection system according to claim 2, wherein
the indication means displays the marker upstream in the transport direction as viewed from the inspection device and downstream of the transport direction as viewed from the inspection device.

10. An inspection system according to claim 1, wherein
the indication means displays a marker near the loading position indicating a timing when the baggage should be placed on the belt.

11. An inspection system according to claim 10, wherein
the indication means has plural light-emitting elements to display the marker.

12. An inspection system according to claim 10, wherein
the indication means displays the marker in accordance with a time at which the baggage holder should place the baggage on the belt.

13. An inspection system according to claim 10 further comprising:
a protector to protect an edge of the belt in a widthwise direction,
wherein
the indication means displays the marker on the protector.

14. An inspection system according to claim 4, wherein
the indication means displays the marker by projecting an image of the marker.

15. An inspection system according to claim 14, wherein
the indication means displays the marker upstream in the transport direction as viewed from the inspection device and downstream of the transport direction as viewed from the inspection device.

16. An inspection system according to claim 11, wherein
the indication means displays the marker in accordance with a time at which the baggage holder should place the baggage on the belt.

17. An inspection system according to claim 16 further comprising:
a protector to protect an edge of the belt in a widthwise direction,
wherein
the indication means displays the marker on the protector.

* * * * *